Oct. 1, 1957  W. W. GRIMES  2,807,961

AUTOMATIC LIQUID SAMPLER

Filed April 5, 1954

*INVENTOR.*
WILLIAM W. GRIMES

BY

*Leland L. Chapman*
ATTORNEY

United States Patent Office 2,807,961
Patented Oct. 1, 1957

2,807,961

AUTOMATIC LIQUID SAMPLER

William W. Grimes, Cleveland, Ohio, assignor to The Standard Oil Company, Cleveland, Ohio, a corporation of Ohio Application April 5, 1954, Serial No. 420,838

1 Claim. (Cl. 73—422)

The present invention relates to a device for obtaining a semi-continuous representative sample from a liquid stream.

Although the invention is applicable to the sampling of any liquid, it will be described in connection with an embodiment especially adapted for sampling waste water, more particularly waste water containing oil.

In recent years, there has been a spirited drive for the reduction of contamination and pollution of public water bodies. This drive has led to statutes in many of the States regulating the quality of waste water which may be legally discharged from the various industrial plants. Consequently, the past several years have been a period during which extensive developments have occurred in the fields of waste water treatment and control.

Because many of the State pollution statutes require regular reports on the wastes discharged in industrial waters, there has been a great deal of activity related to the design of continuous waste water samplers. Since most of the common industrial wastes are soluble in water, sampling of most waste water streams is not complicated, and there are numerous devices available commercially for the sampling of ordinary waste water streams.

However, the petroleum refining industry is confronted with special waste water problems. A modern petroleum refinery uses large quantities of water, and it is inevitable that some oil will become admixed with the water as it is used in the plant. While concerted efforts have been made to conserve water by recycling, it is not possible in the present state of technology to recycle all of the water and at least a part of the water must be continually discarded. The water that is discarded will contain some oil, but it is important to ascertain the exact quantity of oil in this water. Small quantities of oil are harmless, but larger quantities of oil not only may create a fire hazard but will also deprive a water body of oxygen which is necessary to healthy aquatic life.

Since the total amount of oil discharged in the waste water is estimated by multiplying the concentration of the oil in a given sample by the total volume of the waste water, it is imperative that a truly representative sample of the waste water be obtained. The determination of small amounts of oil in water is difficult at best, but there are greater difficulties associated with the procurement of a representative sample of the water for analysis. These difficulties arise from the insolubility of oil and water and the difference in the specific gravities of oil and water which gives oil a natural tendency to rise to the surface when mixed with water.

Accordingly, it is the object of this invention to provide a device by means of which it is possible to obtain a representative sample of a liquid, especially waste water containing small amounts of oil.

The invention will be better understood by reference to the attached drawing which illustrates a typical embodiment in which.

Figure 1:
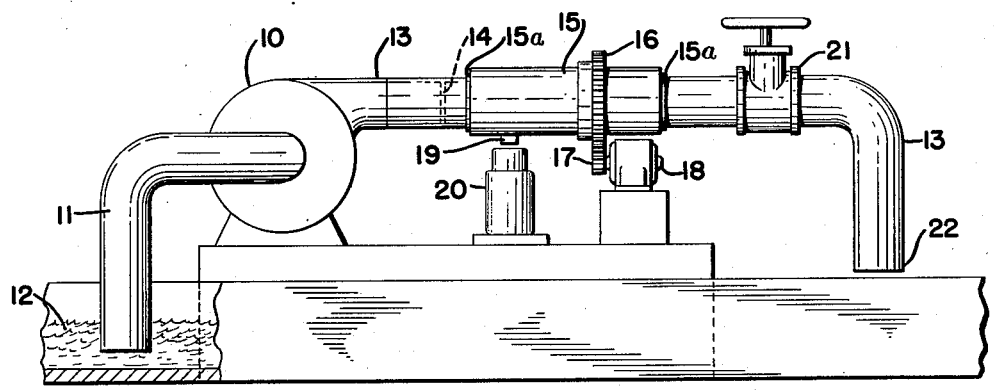
Figure 1 represents an installation of a mechanism for sampling in accordance with my invention.
Figure 2:
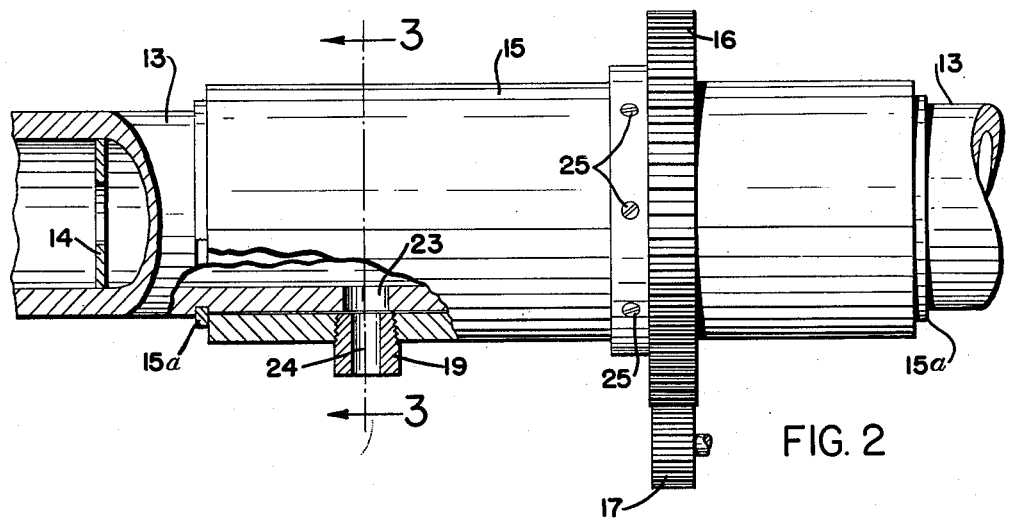
Figure 2 is an enlargement of a part of the installation shown in Figure 1 with partial sections cut away so as to reveal the arrangement of certain parts.

Referring to the accompanying drawing wherein similar reference characters resignate similar parts throughout, the improved sampling device comprises a centrifugal pump 10 which picks up a portion of the waste water by means of line 11 from the waste water channel 12 at which point the waste water stream is in a state of turbulent flow and the oil is upniformly suspended or emulsified in the water. The amount of water pumped through the sampling device is many times greater than the desired sample volume. The centrifugal pump 10 discharges into the line 13. A valve 21 is placed in the line 13 to enable the pump 10 to develop sufficient suction pressure to draw up water from the channel at 12. The unsampled water is discharged from the line 13 back into the waste water channel at 22. This recirculation assists in maintaining the oil in suspension and assuring a uniform sample.

Line 13 also preferably contains a restriction such as the orifice plate 14 immediate to the pump discharge in order to insure the homogeneous distribution of oil in the water to be sampled.

The sample withdrawing means comprises a cylindrical sleeve 15 which covers a part of the line 13 and is revolvably movable with respect to the line 13. Packing 15a may be employed to prevent excessive water from flowing between the line 13 and the sleeve 15. The sleeve 15 has a girth gear attached to it by means of set screws 25, and the gear 16 meshes with a pinion 17 which is mounted on the shaft of a variable-speed electric motor 18. The sleeve 15 is therefore revolvable about the line 13 by means of the aforesaid gear and the pinion attached to the electric motor. The line 13 is drilled through to provide a small hole 23 which is enveloped by said sleeve. A similar hole 24 is drilled in the sleeve 15 in circumferential alignment with the hole 23. The holes are aligned so as to be in radial alignment a part of the time as the sleeve 15 revolves about the line 13. In this embodiment of the invention, the hole 24 is threaded and a nozzle 19 is inserted therein. A small sample of the water is discharged through the nozzle 19 into a sample container 20.

Figure 3:
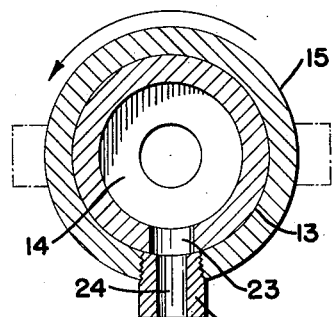
Figure 3 is a sectional view cut along the line 3—3 of Figure 2 and looking in the direction of the arrows.

Figure 3 shows the device in the position during which the sample is discharged. As can be seen, the hole 24 in the sleeve 15 is directly opposite the hole 23 in the line 13 permitting the flow of liquid from the line 13 through the nozzle 19. As the sleeve 15 revolves about the line 13, the opening 23 is sealed by the sleeve 15 so that passage of the liquid through the opening 23 is effectively prevented. The frequency of samplings is, of course, controlled by the speed of revolution of the sleeve 15 about the line 13 and can be varied over a rather broad range. The amount of sample can be controlled by the size of the opening 24, and nozzles 19 with different size openings may be used. In slow sampling intervals the opening 23 will be uncovered for a longer time and the amount of the sample can be reduced by a nozzle with a smaller opening 24.

In place of the gears 16 and 17 and the motor 18 any other moving means can be used, or the sleeve 15 can be moved by hand.

It is intended to cover all modifications and changes in this invention which are included within the appended claim.

I claim:

In an automatic liquid sampling device particularly adapted to produce representative samples of water streams containing small amounts of oil, the combination of a conduit through which the oily water to be sampled is passed, there being an opening in said conduit for the withdrawal of a sample, means for uniformly dispersing the oil in the water as it flows through said conduit comprising a centrifugal pump which impels the water through said conduit and an orifice plate located within said conduit and adjacent the opening therein, and means for withdrawing a sample from said conduit consisting of a rotatable external sleeve surrounding said conduit, there being an opening in said sleeve corresponding to and in circumferential alignment with the opening in said conduit, and external means for rotating said sleeve comprising gear means and variable-speed driving means whereby said sleeve may be continuously rotated to bring the opening in said sleeve periodically into radial alignment with the opening in said conduit so that a representative sample of the oily water may be withdrawn from said conduit.

References Cited in the file of this patent

UNITED STATES PATENTS

| | | |
|---|---|---|
| 1,108,278 | Thomas | Aug. 25, 1914 |
| 2,270,511 | Crain | Jan. 20, 1942 |
| 2,309,625 | Cantrell | Feb. 2, 1943 |
| 2,516,097 | Woodham et al. | July 18, 1950 |